(12) United States Patent
Shirai

(10) Patent No.: US 7,027,810 B2
(45) Date of Patent: Apr. 11, 2006

(54) METHOD OF DETERMINING ELECTRIC FIELD STATE OF MOBILE STATION ALSO IN VIEW OF ELECTRIC FIELD STATE OF UPLINK

(75) Inventor: Koji Shirai, Saitama (JP)

(73) Assignee: NEC Corporation, Tokyo (JP)

( * ) Notice: Subject to any disclaimer, the term of this patent is extended or adjusted under 35 U.S.C. 154(b) by 280 days.

(21) Appl. No.: 10/238,635

(22) Filed: Sep. 11, 2002

(65) Prior Publication Data

US 2003/0050057 A1 Mar. 13, 2003

(30) Foreign Application Priority Data

Sep. 12, 2001 (JP) ............... 2001-276554

(51) Int. Cl.
*H04Q 7/20* (2006.01)
*H04Q 7/216* (2006.01)
*H04B 7/00* (2006.01)
*H04B 1/69* (2006.01)

(52) U.S. Cl. ............ 455/423; 455/522; 455/525; 370/335; 375/141

(58) Field of Classification Search ........... 455/522, 455/69, 552.1, 70, 525, 436, 437, 67.16; 375/141; 370/335
See application file for complete search history.

(56) References Cited

U.S. PATENT DOCUMENTS

| | | | | |
|---|---|---|---|---|
| 5,502,749 A | * | 3/1996 | Ozaki ................... | 375/368 |
| 5,751,763 A | * | 5/1998 | Bruckert ............... | 375/141 |
| 5,924,043 A | * | 7/1999 | Takano ................. | 455/522 |
| 6,119,018 A | * | 9/2000 | Kondo .................. | 455/522 |
| 6,140,960 A | * | 10/2000 | Kitayoshi ............. | 342/360 |
| 6,243,591 B1 | * | 6/2001 | Takemura ............. | 455/522 |
| 6,414,948 B1 | * | 7/2002 | Sato .................... | 370/335 |
| 6,459,884 B1 | * | 10/2002 | Amezawa ............. | 455/67.16 |
| 6,580,919 B1 | * | 6/2003 | Saito ................... | 455/522 |
| 6,603,980 B1 | * | 8/2003 | Kitagawa et al. ..... | 455/522 |
| 6,628,924 B1 | * | 9/2003 | Miyamoto ............ | 455/69 |
| 6,745,049 B1 | * | 6/2004 | Uchida et al. ........ | 455/560 |
| 6,747,963 B1 | * | 6/2004 | Park et al. ............ | 370/335 |
| 6,757,550 B1 | * | 6/2004 | Yoneyama et al. ... | 455/525 |
| 6,813,508 B1 | * | 11/2004 | Shioda et al. ........ | 455/525 |

(Continued)

FOREIGN PATENT DOCUMENTS

EP 0 878 973 A1 11/1998

(Continued)

*Primary Examiner*—William Trost
*Assistant Examiner*—Kiet Doan
(74) *Attorney, Agent, or Firm*—Foley & Lardner LLP

(57) ABSTRACT

A method of determining the present electric field state of a mobile station also in view of an uplink electric field state is disclosed. A TPC bit counter is supplied with a received signal processed by a baseband processor, and counts TPC bits contained in one radio frame. An electric field state determining unit measures the electric field strength of the received signal from the base station which has been received by an RF receiver. A received electric field strength measuring unit determines a TPC bit evaluation value from the TPC bit sum calculated by TPC bit counter, determines a received electric field strength evaluation value from the received electric field strength measured by the electric field state determining unit, multiplies the TPC bit evaluation value by the received electric field strength evaluation value to calculates an electric field state evaluation value, and controls an alarm unit, a display unit, and an LED unit based on the calculated electric field state evaluation value for thereby indicating the electric field state.

5 Claims, 4 Drawing Sheets

U.S. PATENT DOCUMENTS

| | | | |
|---|---|---|---|
| 6,865,168 B1* | 3/2005 | Sekine | 370/335 |
| 2001/0050902 A1* | 12/2001 | Asanuma | 370/248 |
| 2002/0012383 A1* | 1/2002 | Higuchi et al. | 375/141 |
| 2002/0093940 A1* | 7/2002 | Toskala et al. | 370/350 |
| 2003/0003875 A1 | 1/2003 | Oestreich | |

FOREIGN PATENT DOCUMENTS

| | | |
|---|---|---|
| JP | 10-126337 A | 5/1998 |
| JP | 2000-354022 A | 12/2000 |
| JP | 2001-007763 A | 1/2001 |
| WO | WO 01/52440 A2 | 7/2001 |

* cited by examiner

METHOD OF DETERMINING ELECTRIC FIELD STATE OF MOBILE STATION ALSO IN VIEW OF ELECTRIC FIELD STATE OF UPLINK

BACKGROUND OF THE INVENTION

1. Field of the Invention

The present invention relates to a mobile station in a mobile communications system, and more particularly to a method of determining the present electric field state of a mobile station in a mobile communications system.

2. Description of the Related Art

Mobile stations in conventional mobile communications systems measure the strength of a received electric field (RSSI (Received Signal Strength Indicator), Ec/No, SIR, etc.) of a downlink from a base station to a mobile station, and determine the state of the electric field based on the magnitude of the measured strength of the received electric field, so that the user can know the present electric field state.

The above process of determining an electric field state at a mobile station in the conventional mobile communications systems takes into account only the electric field state of a downlink. For this reason, the determined electric field state may not be in conformity with an actual electric field state. Stated otherwise, if the electric field state of a downlink is judged as good, then the conventional process declares an acceptable electric field state even though the electric field state of an uplink is poor. Consequently, a link may fail to be established when the user wants to make a call actually through the mobile station, or a link that has been established may be disconnected during a call.

Therefore, the conventional process of determining an electric field state has been problematic in that since it determines an electric field state by taking into account only the electric field state of a downlink, the determined electric field state may not be the same as an actual electric field state.

SUMMARY OF THE INVENTION

It is therefore an object of the present invention to provide a method of determining an electric field state with high accuracy by taking into account also the electric field state of an uplink.

To achieve the above object, there is provided in accordance with the present invention a method of determining the present electric field state of a mobile station in a mobile communications system, comprising the steps of counting TPC bits in a plurality of slots in a predetermined period to calculate a TPC bit sum, measuring a received electric field strength of a signal received from a base station, determining a TPC bit evaluation value from the calculated TPC bit sum, determining a received electric field strength evaluation value from the measured received electric field strength, calculating an electric field state evaluation value from the TPC bit evaluation value and the received electric field strength evaluation value, and determining the present electric field state of the mobile station based on the calculated electric field state evaluation value.

With the above method according to the present invention, the electric field state of the mobile station is determined also in view of the electric field state of the uplink by counting TPC bits. Therefore, the method is capable of producing a highly accurately result in conformity with the actual electric field state.

The above step of calculating an electric field state evaluation value may comprise the step of multiplying the TPC bit evaluation value by the received electric field strength evaluation value. The predetermined period may comprise one radio frame.

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 1:
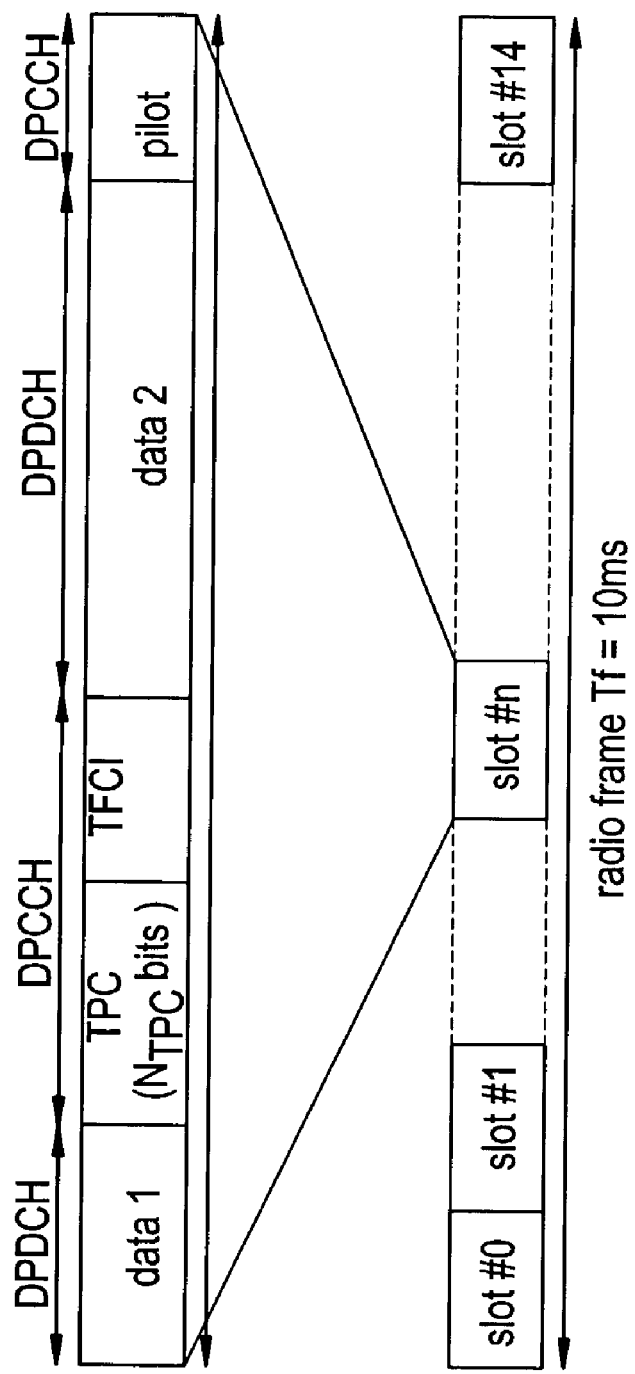
FIG. 1 is a diagram showing a transmission pattern for a DPCH over a downlink.

Prior to describing a mobile station according to an embodiment of the present invention, a transmission power control process for an uplink, which serves as a basis for a method of determining an electric field state according to the embodiment of the present invention, will be described below.

In recent years, attention has been drawn to a CDMA (Code Division Multiple Access) communications process which is highly resistant to interference and disturbance as communications process for use in mobile communications systems. According to the CDMA communications process, a transmission side spreads a user signal to be transmitted with a spread code and transmits the spread user signal to a reception side, and the reception side despreads the received user signal using the same spread code as the one used in the transmission side to obtain the original user signal. The CDMA communications process makes it possible to use the same frequency band among a plurality of communication events or calls because it allows a plurality of transmission sides to use respective different spread codes to spread their user signals, respectively, and allows a plurality of users to select spread codes to be used to despread the received user signals for identifying the calls. The present invention is concerned with the determination of an electric field state based on the uplink transmission power control technology used in the CDMA communications process.

According to the CDMA communication technology, spread codes do not interfere with each other if they are completely orthogonal to each other. However, since it is difficult to keep all spread codes that are used completely orthogonal to each other, the spread codes in use are actually not completely orthogonal to each other, but have some correlative components with respect to each other. These correlative components act to interfere with user signals of their own, resulting in a degradation of the quality of communication events or calls. Since interference components are produced for this reason, such interference components grow as the number of communication events or calls increases. If the transmission power from all mobile stations is of a constant level, then a radio wave from a mobile station near a base station is so strong that it interferes with a signal from a mobile station far from the base station, resulting in a so-called near/far problem. To solve this near/far problem, it is customary to use a transmission power control process for setting the transmission power to a suitable value for an uplink from a mobile station to a base station.

Specifically, the transmission power control process allows the mobile station to increase or reduce the transmission power of an uplink based on the value of a TPC (Transmission Power Control) bit in each slot of a DPCH (Dedicated Physical CHannel) that has been received. The transmission power control process is carried out such that the BLER (BLock Error Rate) becomes equal to or smaller than a target value in each of the base and mobile stations.

FIG. 1 shows a transmission pattern of a DPCH over a downlink (extracted from the 3GPP (3rd Generation Partnership Project) specifications). As shown in FIG. 1, one radio frame has a frame period of 10 ms and comprises 15 slots. The 14 slots #1 through #14 except the leading slot #0 have a TPC bit each. The DPCH comprises DPDCHs (Dedicated Physical Data CHannels) and DPCCHs (Dedicated Physical Control CHannels), with the TPC bit being included in the DPCCHs. The bit number $N_{TPC}$ of the TPC bit may be one or two depending on the specifications. The relationship between the TPC bit pattern and the transmission power is shown in Table 1 (extracted from the 3GPP specifications).

TABLE 1

| TPC bit pattern | | Transmission power |
|---|---|---|
| $N_{TPC} = 1$ | $N_{TPC} = 2$ | Control |
| 1 | 11 | Transmission power to be increased |
| 0 | 00 | Transmission power to be reduced |

As can be seen from Table 1, if the TPC bit is "1" or "11", then it indicates an increase in the transmission power from the base station to the mobile station, and if the TPC bit is "0" or "00", then it indicates a reduction in the transmission power from the base station to the mobile station.

Figure 2:
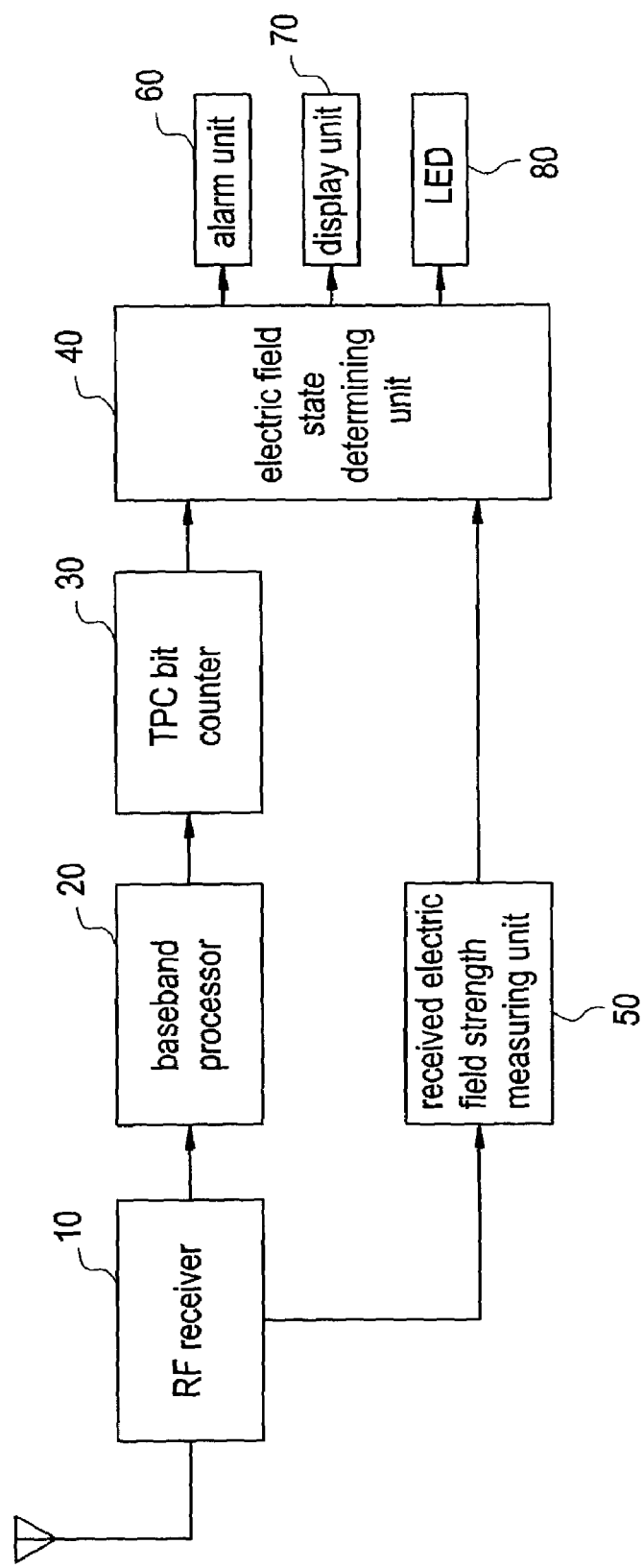
FIG. 2 is a block diagram of a mobile station according to an embodiment of the present invention.

The structure of a mobile station according to an embodiment of the present invention is shown in FIG. 2. As shown in FIG. 2, the mobile station according to the embodiment of the present invention has RF receiver 10, baseband processor 20, TPC bit counter 30, electric field state determining unit 40, received electric field strength measuring unit 50, alarm unit 60, display unit 70, and LED unit 80.

RF receiver 10 demodulates a signal from a base station which is received by an antenna into a baseband signal. Baseband processor 20 processes the baseband signal from RF receiver 10. TPC bit counter 30 is supplied with the received signal processed by baseband processor 20, counts TPC bits contained in one radio frame, and outputs the count as a TPC bit sum. Electric field state determining unit 40 measures the electric field strength of the signal from the base station which has been received by RF receiver 10.

Received electric field strength measuring unit 50 determines a TPC bit evaluation value from the TPC bit sum calculated by TPC bit counter 30, determines a received electric field strength evaluation value from the received electric field strength measured by electric field state determining unit 40, multiplies the TPC bit evaluation value by the received electric field strength evaluation value to calculates an electric field state evaluation value, and controls alarm unit 60, display unit 70, and LED unit 80 based on the calculated electric field state evaluation value for thereby indicating the electric field state.

Examples of the relationship between the TPC bit sum and the TPC bit evaluation value is shown in Table 2 below, and examples of the relationship between the received electric field strength and the received electric field strength evaluation value is shown in Table 3 below.

TABLE 2

| TPC bit sum | TPC bit evaluation value | Uplink electric field state |
|---|---|---|
| 14 | 0 | Poor |
| ... | ... | ... |
| 0 | 14 | Good |

TABLE 3

| Received electric field strength | Received electric field strength evaluation value | Downlink electric field state |
|---|---|---|
| −25 dBm | 144 | Good |
| ... | ... | ... |
| −120 dBm | 0 | Poor |

In Table 2, as the number of TPC bits in one radio frame is larger, the BLER of signals received by the base station is poorer. Therefore, larger TPC bit evaluation values correspond to smaller TPC bit numbers.

In Table 3, as the received electric field strength has a higher level, the received electric field strength evaluation value is larger, indicating a better reception state.

The relationship between the electric field strength evaluation value and the electric field state is shown in Table 4 below.

TABLE 4

| Electric state evaluation value | Electric field state |
|---|---|
| 2016 | Good |
| ... | ... |
| 0 | Poor |

Because the electric field strength evaluation value is calculated according to "electric field strength evaluation value=TPC bit evaluation value×received electric field strength evaluation value", the electric field state is judged as better as the electric field strength evaluation value is higher.

The standard by which the base station instructs the mobile station to increase or reduce the transmission power is whether the present transmission power level of the mobile station satisfies a target BLER value preset in the base station or not. A transmission power control process is illustrated by way of example in FIG. 3.

If the mobile station is receiving a TPC bit ("1" or "11") indicating an increase in the transmission power in successive slots, then the base station is instructing the mobile station to increase the transmission power level because the present transmission power level fails to satisfy the target BLER value. Stated otherwise, the present transmission power level of the mobile station is low enough to impair the BLER of the signal received by the base station.

In a method of determining an electric field state according to the embodiment of the present invention, the above function is utilized to determine whether the electric field level of signals transmitted and received by the mobile station also in view of the electric field state of the uplink from the mobile station to the base station.

Figure 3:
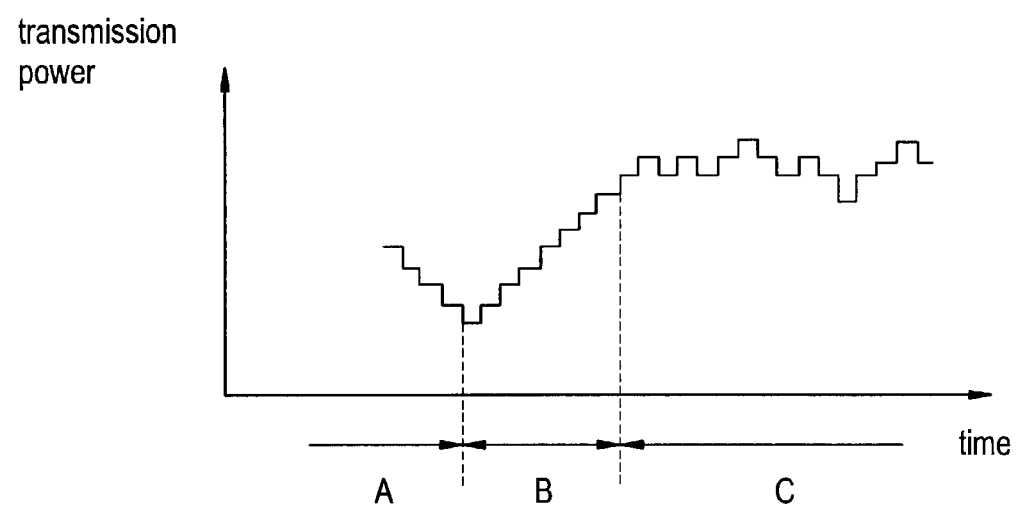
FIG. 3 is a graph illustrating a transmission power control process.

In a zone A shown in FIG. 3, the BLER of the received signal is lower than a target value. In a zone B, the transmission power control process is carried out in order to equalize the BLER of the received signal to the target value.

In a zone C, the BLER of the received signal is equalized to the target value, and the transmission power is controlled to keep the target value.

As can be seen from Tables 2, 3, and 4, even when the received electric field strength evaluation value is a maximum value, if the TPC bit evaluation value is a lowest value, the total electric field state evaluation value is low, so that the electric field state is judged as poor. Conversely, even if the TPC bit evaluation value is a highest value, when the received electric field strength evaluation value is a minimum value, the total electric field state evaluation value is low, so that the electric field state is judged as poor.

Examples of operation of the electric field state determining unit 40 to control alarm unit 60, display unit 70, and LED unit 80 using electric field state evaluation values that are obtained are shown in Table 5 below.

TABLE 5

| Electric field state evaluation value | Electric field state | Antenna bars | Alarm threshold | Number of energized LEDs |
|---|---|---|---|---|
| 2016 | Good (max.) | 3 | | 4 |
| ... | | | | |
| 1500 | | | | 3 |
| ... | | 2 | | |
| 1000 | | | | 2 |
| ... | | | | |
| 500 | | 1 | | 1 |
| ... | | | Alarm is turned on at 250 or less | |
| 0 | Poor (min.) | Out of range | | 0 |

With the method of determining an electric field state with the mobile station according to the embodiment of the present invention, the electric field state of the mobile station is determined also in view of the electric field state of the uplink by counting TPC bits. Therefore, the method is capable of producing a highly accurately result in conformity with the actual electric field state.

Figure 4A:
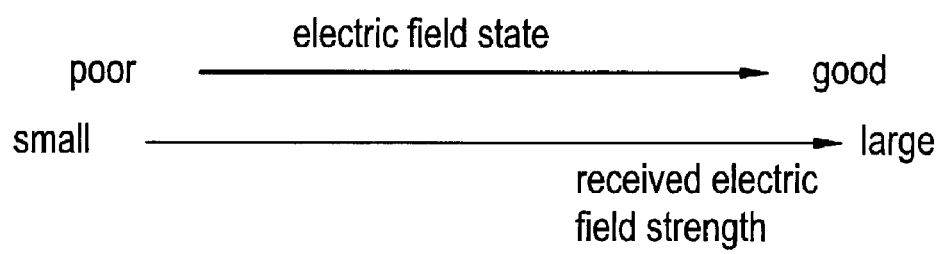
FIG. 4a is a diagram showing the concept of a conventional process of determining an electric field state.
Figure 4B:
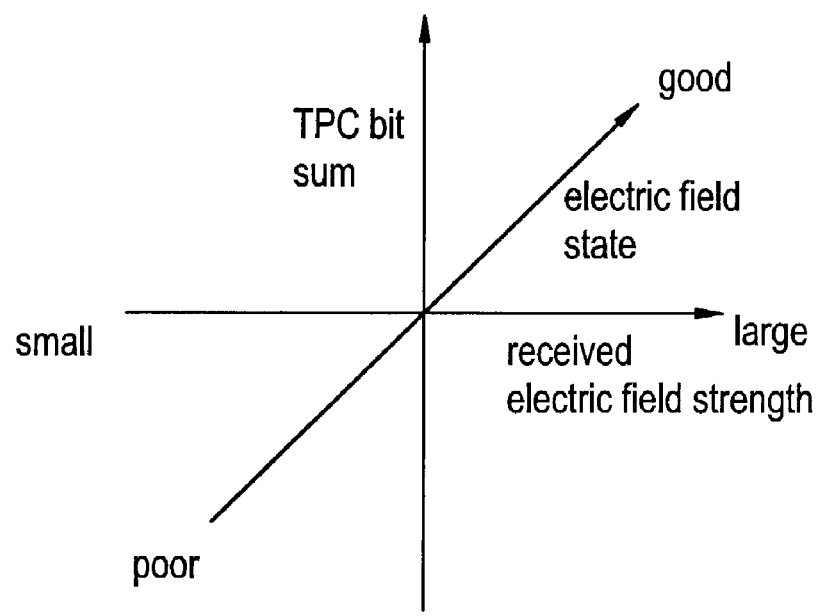
FIG. 4b is a diagram showing the concept of a method of determining an electric field state according to the embodiment of the present invention.

Heretofore, since an electric field state has been determined based on only the strength of the electric field state, the electric field state is judged based on one parameter, i.e., judged as good if only the received electric field strength is of a large value, as shown in FIG. 4*a*. However, the method of determining an electric field state according to the embodiment of the present invention can judge the electric field state based on two parameters, i.e., the received electric field strength and the TPC bit sum, as shown in FIG. 4*b*, and hence can make more accurate decisions than the conventional process. The method of determining an electric field state according to the embodiment of the present invention is therefore capable of the total electric field state not only in a reception mode but also in a transmission mode.

In the above embodiment, the uplink electric field state is determined by counting TPC bits contained in one radio frame. However, if the radio wave suffers frequent abrupt changes, then TPC bits may be counted in a plurality of radio frames for determining the uplink electric field state more stably.

In the above embodiment, the electric field state evaluation value is calculated by multiplying the TPC bit evaluation value by the received electric field strength evaluation value. However, the electric field state evaluation value may be calculated from the TPC bit evaluation value and the received electric field strength evaluation value according to another formula. In the above embodiment, TPC bits contained in one frame are simply added to calculate a TPC bit sum, and a TPC bit evaluation value is calculated from the TPC bit sum. However, a TPC bit evaluation value may be calculated according to another formula, not by simply adding TPC bits.

While a preferred embodiment of the present invention has been described in specific terms, such description is for illustrative purposes only, and it is to be understood that changes and variations may be made without departing from the spirit or scope of the following claims.

What is claimed is:

1. A method of determining the present electric field state of a mobile station in a mobile communications system, comprising the steps of:
    counting TPC bits in a plurality of slots in a predetermined period to calculate a TPC bit sum;
    measuring a received electric field strength of a signal received from a base station;
    determining a TPC bit evaluation value from the calculated TPC bit sum;
    determining a received electric field strength evaluation value from the measured received electric field strength;
    calculating an electric field state evaluation value from said TPC bit evaluation value and said received electric field strength evaluation value; and
    determining the present electric field state of the mobile station based on the calculated electric field state evaluation value, wherein
    calculating an electric field state evaluation value comprises the step of multiplying said TPC bit evaluation value by said received electric field strength evaluation value; wherein said predetermined period comprises one radio frame.

2. A mobile station comprising: a TPC bit counter for counting TPC bits in a plurality of slots in a predetermined period to calculate a TPC bit sum;
    a received electric field strength measuring unit for measuring a received electric field strength of a signal received from a base station; and
    an electric field state determining unit for determining a TPC bit evaluation value from the calculated TPC bit sum, determining a received electric field strength evaluation value from the received electric field strength measured by said received electric field strength measuring unit, calculating an electric field state evaluation value from said TPC bit evaluation value and said received electric field strength evaluation value, and determining the present electric field state of the mobile station based on the calculated electric field state evaluation value, wherein
    electric field state determining unit comprises means for calculating said electric field state evaluation value by multiplying said TPC bit evaluation value by said received electric field strength evaluation value; wherein said predetermined period comprises one radio frame.

3. A method for determining a present electric field state of a mobile station in communication with a base station, the method comprising:
    determining a first value indicative of an uplink electric field state of an uplink from the mobile station to the base station;
    determining a second value indicative of a downlink electric field state of a downlink from the base station to the mobile station; and determining a third value representing the present electric field state of the mobile station based on the first and second values, said third value within a range of more than two possible values.

4. The method of claim 3,
wherein the first value, the second value, and the third value are determined after a link has been established between the mobile station and the base station.

5. The method of claim 3,
wherein the first value, the second value, and the third value are determined periodically by the mobile station while the mobile station is in communication with the base station.

\* \* \* \* \*